(12) United States Patent
Bendtsen et al.

(10) Patent No.: US 6,766,886 B2
(45) Date of Patent: Jul. 27, 2004

(54) SELF-ADJUSTING BRAKING APPARATUS

(75) Inventors: Randall R. Bendtsen, Peoria, IL (US); Jens M. Erp, Dekalb, IL (US); Mark D. Fabry, Morton, IL (US); Alan D. Gustafson, Aplington, IA (US); Cary J. Lyons, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/232,017

(22) Filed: Aug. 30, 2002

(65) Prior Publication Data

US 2003/0037998 A1 Feb. 27, 2003

Related U.S. Application Data

(63) Continuation-in-part of application No. 09/843,636, filed on Apr. 26, 2001, now abandoned.

(51) Int. Cl.[7] ............................................. F16D 55/02
(52) U.S. Cl. .................................. 188/196 P; 188/71.8
(58) Field of Search ............................... 188/71.5, 71.8, 188/73.1, 196 P

(56) References Cited

U.S. PATENT DOCUMENTS

| | | | |
|---|---|---|---|
| 2,551,252 A | | 5/1951 | Du Bois |
| 2,695,080 A | * | 11/1954 | Du Bois ...................... 188/366 |
| 3,186,521 A | | 6/1965 | Chouings |
| 3,403,754 A | | 10/1968 | Barrett et al. |
| 3,403,755 A | | 10/1968 | Barrett et al. |
| 3,458,017 A | | 7/1969 | Szymski |
| 3,485,330 A | | 12/1969 | Reiff |
| 3,532,190 A | * | 10/1970 | Palmer ...................... 188/71.8 |
| 3,612,237 A | | 10/1971 | Honda |
| 3,750,783 A | | 8/1973 | Ohtusuka et al. |
| 3,837,439 A | | 9/1974 | Piret |
| 3,946,837 A | | 3/1976 | Houser |
| 4,325,471 A | | 4/1982 | Schuster |
| 4,346,791 A | | 8/1982 | Cumming |
| 4,351,422 A | | 9/1982 | Chauve |
| 4,391,354 A | | 7/1983 | Bucksch |
| 4,867,280 A | | 9/1989 | Von Gruenberg et al. |
| 5,186,284 A | * | 2/1993 | Lamela et al. ............. 188/71.8 |
| 5,186,286 A | * | 2/1993 | Lindberg .................... 188/171 |
| 5,228,543 A | | 7/1993 | Heidenreich |
| 5,366,047 A | | 11/1994 | Beck et al. |
| 6,016,892 A | | 1/2000 | Berwanger |
| 6,070,456 A | | 6/2000 | Cameron et al. |

OTHER PUBLICATIONS

U.S. patent application No. 09/843,636; filed Apr. 26, 2001.

* cited by examiner

*Primary Examiner*—Robert A. Siconolfi
(74) *Attorney, Agent, or Firm*—Steve M Hanley

(57) ABSTRACT

A brake apparatus includes a brake disk secured to a shaft and a reaction plate secured to a housing. The brake apparatus further includes a fluid actuated piston which urges the brake disk against the reaction plate to slow rotation of the shaft and an adjustment member positioned by the piston. The brake apparatus yet further includes a spring interposed between the adjustment member and the piston. The piston positions the adjustment member relative to the brake disk when fluid is applied to said piston. The spring urges the piston away from the adjustment member and brake disk when fluid pressure is removed from the piston.

19 Claims, 4 Drawing Sheets

SELF-ADJUSTING BRAKING APPARATUS

This application is a continuation-in-part of application Ser. No. 09/843,636, filed on Apr. 26, 2001, now abandoned.

TECHNICAL FIELD

The present invention generally relates to a braking apparatus, and more specifically to a self-adjusting braking apparatus.

BACKGROUND

Hydraulically actuated brakes operate by applying a volume of pressurized fluid against a piston. The piston urges a disk attached to a shaft against a reaction member attached to a fixed structure. Friction between the disk and the reaction member causes the rotation of the shaft to slow or stop. Repeated application of the brakes causes wear on the surface of the disk which increases the distance which the piston must travel in order to slow the shaft. This increased distances requires a greater volume of pressurized fluid to be applied to the piston to create the same frictional force.

A disadvantage to requiring a greater volume of pressurized fluid to actuate the brake is that a larger master cylinder is required to supply the pressurized fluid. This larger cylinder can increase the cost of the braking system. This volume increase could be avoided simply by not forcing the piston to retract form the friction disks when actuation pressure is removed. The resulting close clearances between the brake surfaces, however, would cause significant energy to be lost to friction and viscous forces when braking is not being performed. The brake clearances could also be manually adjusted as the brake surfaces wear, reducing the volume of pressurized fluid required and thus the size of the required master cylinder. However, manual adjustment of the piston position is costly, labor intensive, and time consuming. In addition, estimating the rate of wear of the friction material is difficult, making the timing of the brake adjustment difficult to predict.

What is needed therefore is a self-adjusting braking apparatus which overcomes the above-mentioned drawbacks.

SUMMARY OF THE INVENTION

In accordance with a first aspect of the present invention, there is provided a brake apparatus including a brake disk secured to a shaft and a reaction plate secured to a housing. The brake apparatus further includes a fluid actuated piston which urges the brake disk against the reaction plate to slow rotation of the shaft and an adjustment member positioned by the piston. The brake apparatus yet further includes a spring interposed between the adjustment member and the piston. The piston positions the adjustment member relative to the brake disk when fluid is applied to said piston. The spring urges the piston away from the adjustment member and brake disk when fluid pressure is removed from the piston.

In accordance with a second aspect of the present invention, there is provided a method of operating a brake apparatus having a brake disk secured to a shaft, a reaction plate secured to a housing, a fluid actuated piston which urges the brake disk against the reaction plate to slow rotation of the shaft, an adjustment member positioned by the piston, and a spring interposed between the adjustment member and the piston. The method includes the steps of positioning the adjustment member relative to the brake disk by applying fluid to the piston, and urging the piston away from the adjustment member and brake disk with the spring when fluid pressure is removed from the piston.

The invention further provides a brake apparatus including a brake disk driven by a shaft, a reaction plate secured to a housing and a selectively moveable piston having a contact surface engageable with the brake disk wherein the brake disk is urged against the reaction plate to slow rotation of the shaft in response to compressive movement of the piston. An adjustment member is provided between the piston and the reaction member and is operable to: (i) urge the piston away from the brake disk in response to deactivation of the brake assembly, and (ii) readjust a gap clearance between the brake disk and at least one of the piston and the reaction member in response to brake wear.

DETAILED DESCRIPTION

Figure 1:
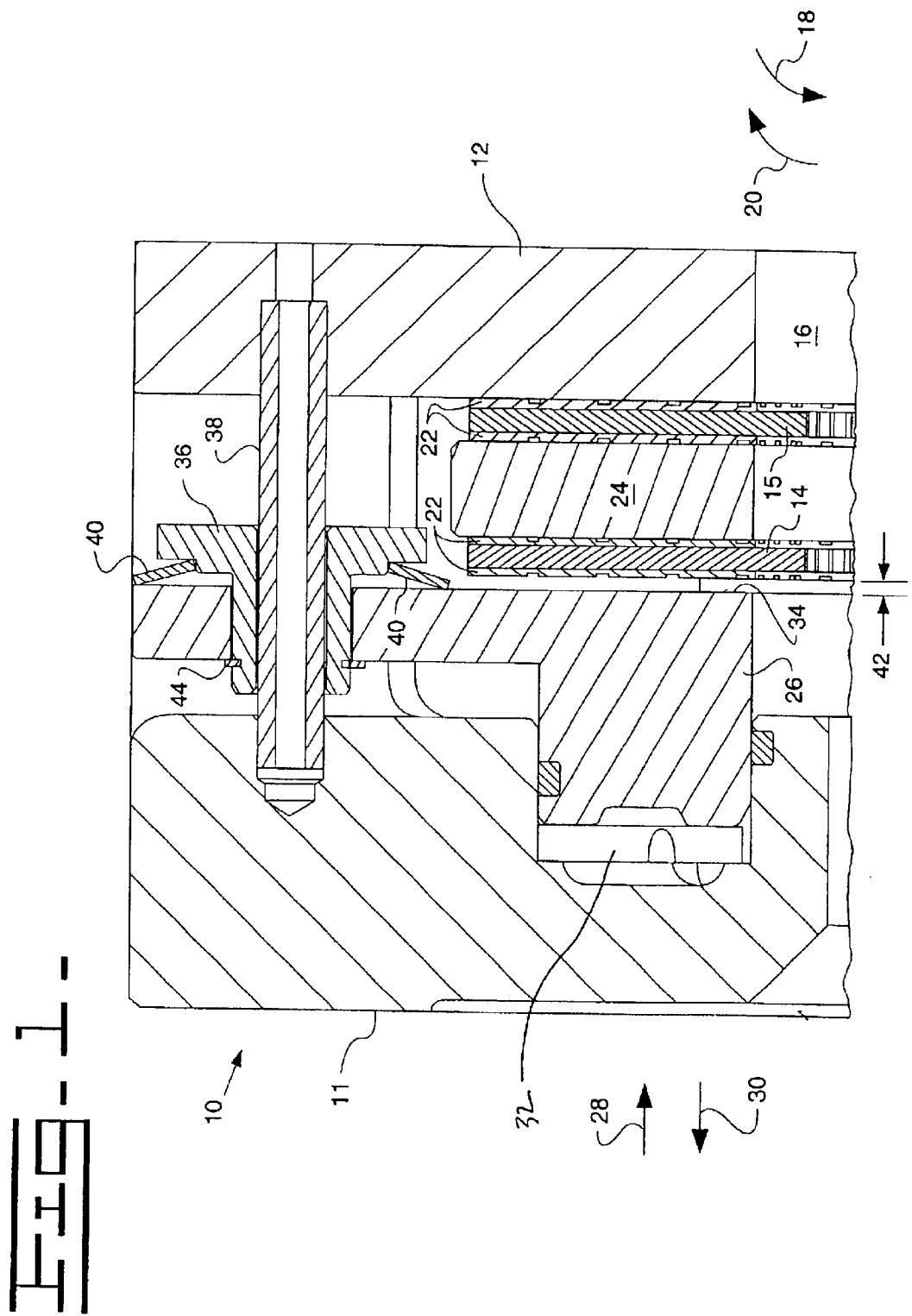
FIG. 1 is a cross-sectional view of a first embodiment of a brake assembly in a non-actuated position which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
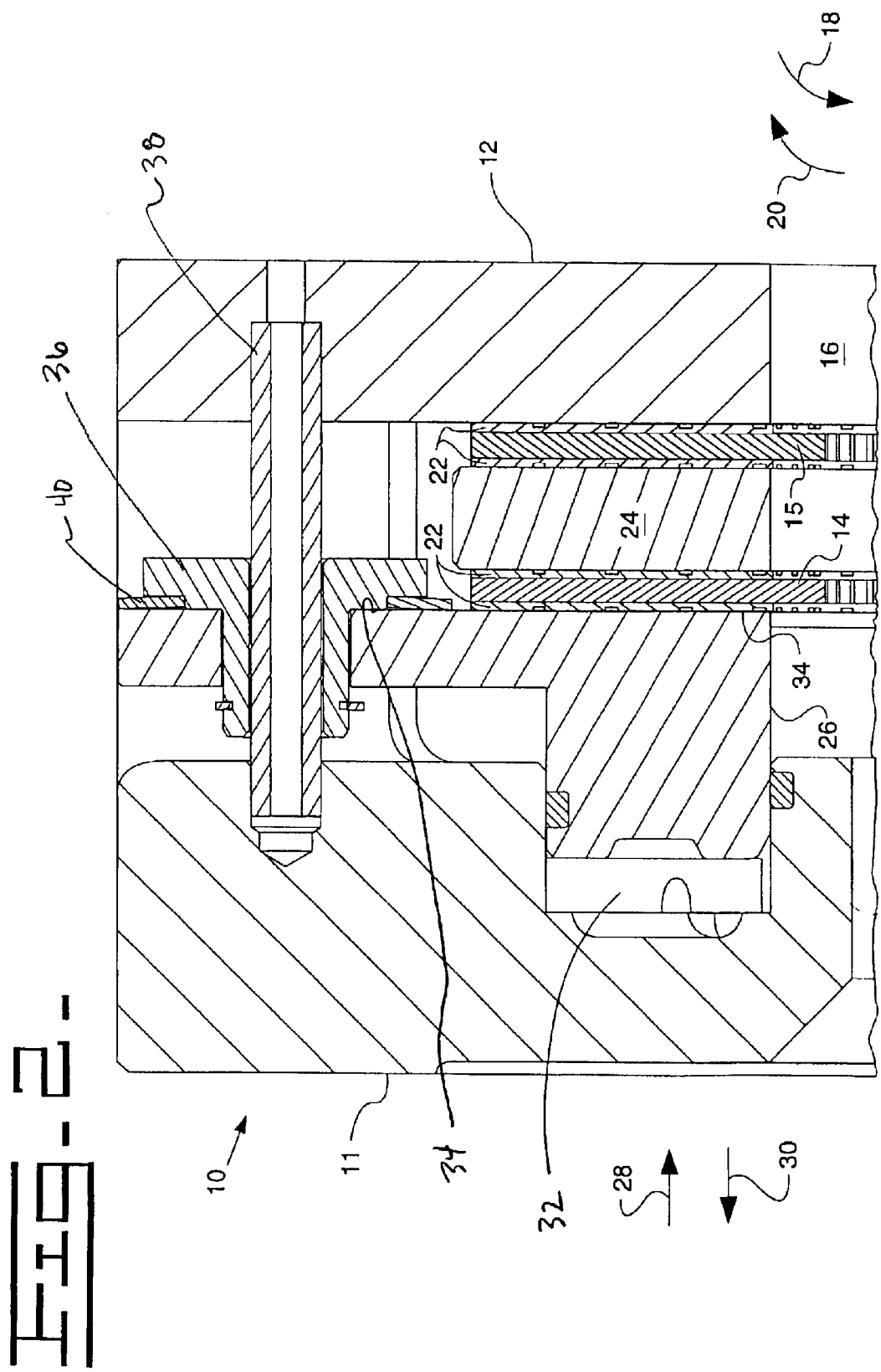
FIG. 2 is a view similar to FIG. 1 but showing the brake assembly in an actuated position.

Referring now to FIGS. 1 and 2, there is shown a cross-sectional view of a braking apparatus 10 which incorporates the features of the present invention therein. The braking apparatus 10 includes a housing 11 and a reaction member 12 secured to the housing 11. It is envisioned that either the hosing 11 or the reaction member 12 or both may be removable sub-assemblies within a main housing (not shown) such as a differential housing, for example. The braking apparatus 10 also includes a pair of brake disks 14, 15 secured to a rotating shaft 16. The shaft 16 is operable to rotate in the general direction of arrows 18 and 20 relative to the housing 11. Each surface of the brake disks 14, 15 is coated with a frictional material 22. The braking apparatus 10 further includes a separator plate 24 positioned between an adjacent pair of brake disks 14, 15.

The braking apparatus 10 further includes a piston 26 operable to translate relative to the housing 11 in the general direction of arrows 28 and 30. The piston 26 is in fluid communication with a fluid cavity 32 defined within the housing 11. To slow or stop rotation of the shaft 16, a volume of pressurized fluid is supplied to the cavity 32 by a pressure source, such as a master brake cylinder (not shown). As pressurized fluid is supplied to the cavity 32, the hydraulic force of the pressurized fluid on the piston 26 urges a contact surface 34 of the piston 26 against the brake disk 14. As the piston 26 moves further in the general direction of arrow 28, the brake disk 14, the separator plate 24, and the brake disk 15 are compressed against the reaction member 12 (as shown in FIG. 2). The frictional forces of the piston 26, separator plate 24, and reaction member 12 acting on the frictional material 22 of the disks 14, 15 causes the shaft 16 to slow or stop rotating in the general direction of arrow 18 or 20.

It should be appreciated that repeated use of the braking apparatus 10 will cause material to wear from the contact surface 34 of the piston 26, frictional material 22 on the disks 14, 15, the surfaces of the separator plate 24, and the surface of the reaction member 12. It should further be appreciated that this wear will require the piston 26 to travel farther in the general direction of arrow 28 to slow the rotation of the shaft 16 as material wears in the braking apparatus 10, unless the piston is continually repositioned. Moreover, this increase in travel distance of the piston 26 requires that a larger volume of fluid be supplied to the cavity 32 to slow the shaft 26.

The braking apparatus 10 further includes a bushing or adjustment member 36, shown in FIG. 2, which is in sliding contact with a pin 38 secured to the housing 11, such that the adjustment member 36 is free to slide or translate along the pin 38 in the general direction of arrows 28 and 30 parallel to the movement of the piston 26. The braking apparatus 10 further includes a spring 40 or biasing member interposed between the adjustment member 36 and the contact surface 34 of the piston 26. The biasing member 40 may either be a Bellville spring (shown in FIGS. 1 and 2), a coil spring (not shown), or other spring.

Referring to FIG. 2, to actuate the brake assembly 10, pressurized fluid is supplied to the cavity 32 and the piston 26 moves in the general direction of arrow 28 compressing the spring 40 between the contact surface 34 and the adjustment member 36 such that the contact surface 34 positions the adjustment member 36 relative to the pin 38 and brake disk 14. As the components within the brake assembly 10 wear, the adjustment member 36 moves further in the general direction of arrow 28 to account for the increased movement of the piston 26 required to slow the shaft 16.

Referring now to FIG. 1, to deactuate the brake assembly 10, pressurized fluid is removed from the cavity 32 allowing the spring 40 to urge the piston 26 back in the general direction of arrow 30 to maintain a clearance 42 between the contact surface 34 of the piston 26 and the brake disk 14. The braking apparatus 10 further includes a retaining ring 44 secured to the adjustment member 36 which limits the movement of the piston 26 relative to the adjustment member 36 in the general direction of arrow 30. It should be appreciated that the frictional force between the pin 38 and the adjustment member 36 is greater than the force of the spring 40 on the adjustment member 36 such that the spring force does not reposition the adjustment member 36 relative to the pin 38 and disk 14. In addition, the force of the spring 40 on the piston 26 must be greater than the frictional forces between the piston 26 and the housing 11 in order for the spring 40 to move the piston 26 in the general direction of arrow 30.

Figure 3:
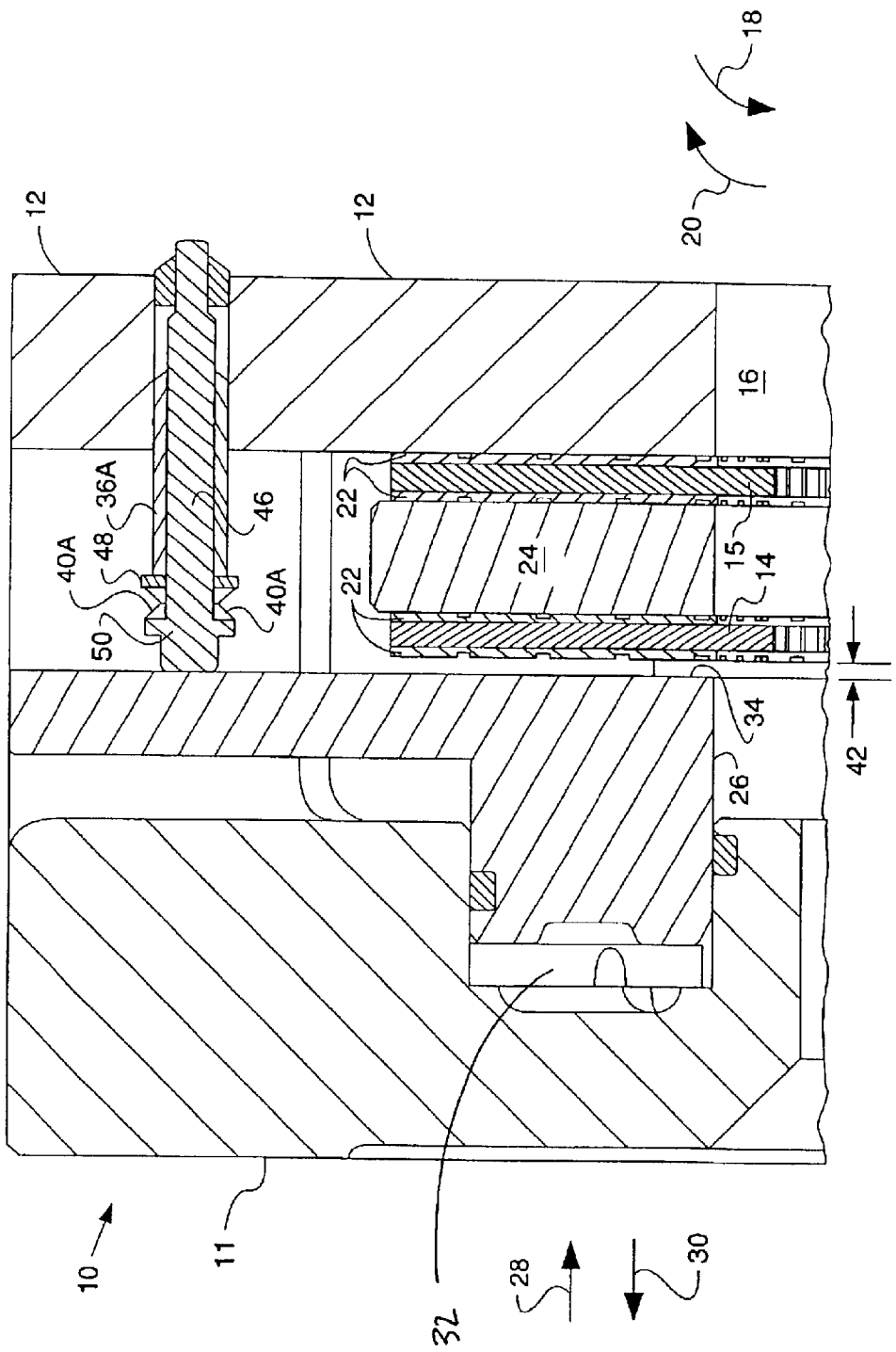
FIG. 3 is a cross-sectional view of a second embodiment of a brake assembly.

Referring now to FIG. 3, there is shown an alternative embodiment of the present invention. Many of the components of the alternate embodiment are the same as the first disclosed embodiment and will not be described in detail for the sake of brevity. The Adjustment member 36A is a sleeve in sliding contact with the reaction member 12. The braking apparatus 10 further includes a bolt 46 positioned within the adjustment member 36A and placed in contact with the contact surface 34 of the piston 36. A ring 48 is placed about the bolt 46 and in contact with the adjustment member 36A. A spring 40A is interposed between a head 50 of the bolt 46 and the ring 48. The spring 40A may either be a Bellville spring (shown in FIG. 3), or a coil spring (not shown), or similar device.

To actuate the brake assembly 10, pressurized fluid is supplied to the cavity 32 which moves the piston 26 in the general direction of arrow 28. As the piston 26 moves, the contact surface 34 urges the bolt 46 to compress the spring 40A between the head 50 of the bolt 46 and adjustment member 36A such that the contact surface 34 positions the adjustment member 36A relative to the reaction member 12 and brake disk 14. As the components within the brake assembly 10 wear, the adjustment member 36A will move farther in the general direction of arrow 28 to account for the increased movement of the piston 26 required to slow the shaft 16.

To deactuate the brake assembly 10, pressurized fluid is removed from the cavity 32 and the spring 40A urges the piston 26 back in the general direction of arrow 30 to maintain the clearance 42 between the contact surface 34 of the piston 26 and the brake disk 14. It should be appreciated that the frictional force between the reaction member 12 and the adjustment member 36A is greater than the force of the spring 40A on the adjustment member 36A such that the spring force does not reposition the adjustment member 36A relative to the reaction member 12 and disk 14. In addition, the force of the spring 40A on the piston 26 must be greater than the frictional forces between the piston 26 and the housing 11 in order for the spring 40A to move the piston 26 in the general direction of arrow 30.

Figure 4:
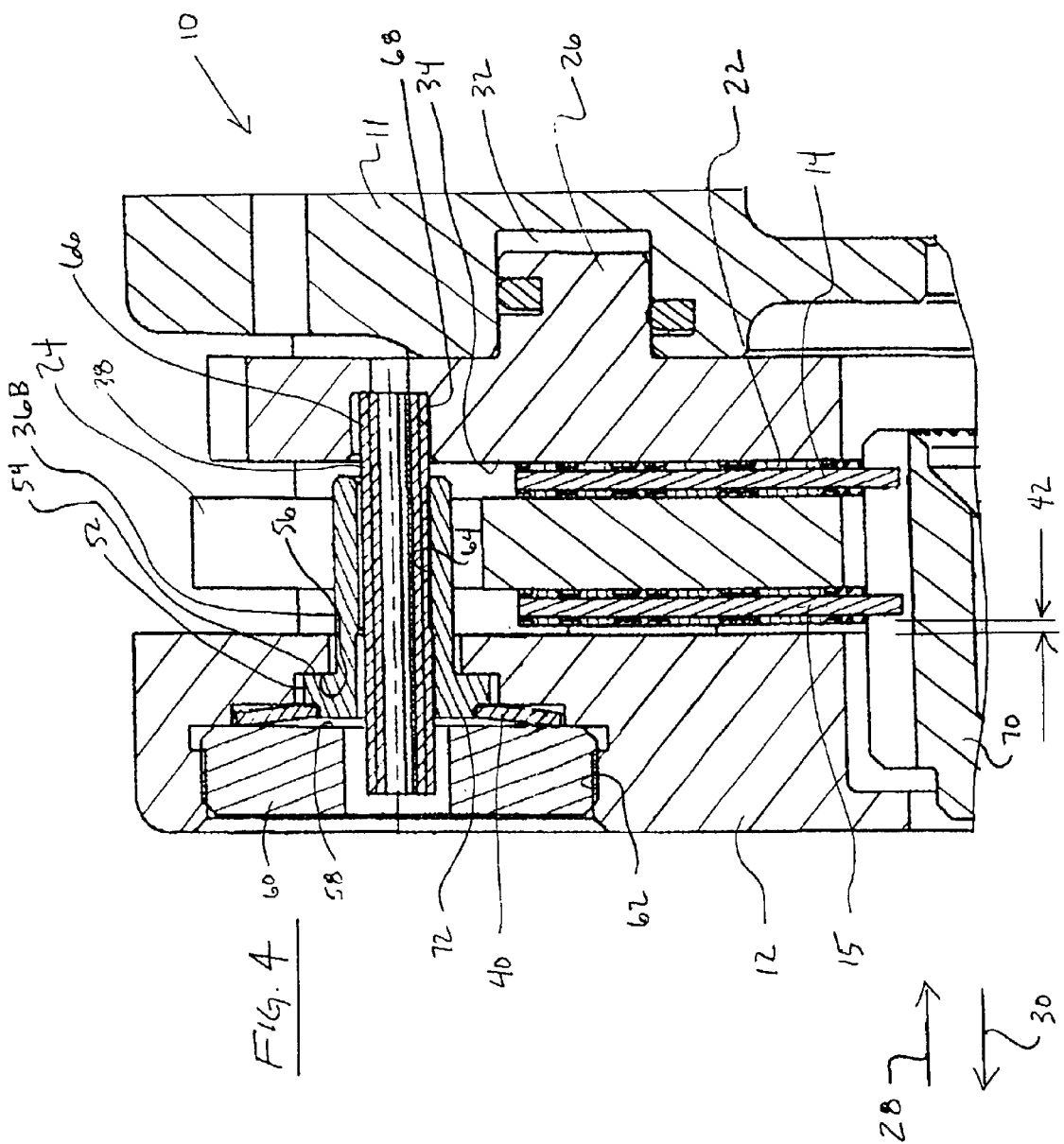
FIG. 4 is a cross-sectional view of a third embodiment of a brake assembly.

Referring to FIG. 4, yet another embodiment of a self-adjusting braking apparatus is shown and differs from the first embodiment in several respects. One such difference includes the adjustment member 36B being retained within the reaction member 12 rather than within the piston 26. The adjustment member 36B includes a flange portion 52 having a contact face 54 which is in contact with a shoulder 56 of the reaction member 12. The spring 40 includes an inner diameter being retained on the adjustment member 36B and an outer diameter engaged with a face 58 of an insert 60. The insert may include peripheral threads which engage a threaded bore 62 in the reaction member 12. The pin 38 is in an interference fit relationship with an inner bore 64 of the adjustment member 36B. An end 66 of the pin 38 is in a loose-fit engagement with a bore 68 in the piston 26.

Each brake disk 14, 15 is fixed to a drive hub 70 at an inner diameter portion of the disks 14, 15. In turn, the drive hub 70 includes axially positioned splines (not shown) which engage counterpart external splines provided on the shaft 16 (see FIGS. 1–3). It will be understood that since the drive hub 70 is allowed to shift axially along the shaft 16, due to the splined engagement between the drive hub 70 and the shaft 16, that the gap 42 may be the sum of the spaces or clearances between the housing 11 and the disk 14 and between the reaction member 12 and the disk 15.

To actuate the brake assembly 10 of FIG. 4, pressurized fluid is supplied to the cavity 32 which moves the piston 26 in the general direction of arrow 30. As the piston 26 moves, the contact surface 34 engages the friction material 22 provided on the brake disk 14 and, in turn the brake disk, the separator plate 24, and the brake disk 15 are compressed against the reaction member 12. Moreover, the piston 26 pushes the pin 38 and the adjustment member 36B, in a unitary motion, in the direction of arrow 30 to compress the spring 40. Once a contact face 72 of the adjustment member 36B contacts the face 58 of the insert 60, the spring 40 is fully compressed coinciding with full activation of the brakes. As the components within the brake assembly 10 wear, the pin 38 will continue to move in the general direction of arrow 30 even though the adjustment member 36B has come to a stop against the insert 60. As a result the adjustment member 36B will be repositioned upon the pin 38 and the gap 42 will be re-adjusted to maintain suitable brake performance.

To deactuate the brake assembly 10, pressurized fluid is removed from the cavity 32 and the spring 40 urges the piston 26 back in the general direction of arrow 28 to re-establish the gap or clearance 42. It will be appreciated that the force required to cause movement between the pin 38 and the adjustment member 36B is greater than the force to fully compress the spring 40 such that the adjustment member will not be repositioned relative the pin 38 unless the spring is fully compressed. Additionally, the force required to fully compress the spring 40 must be greater than the frictional forces generated between the piston 26 and the housing 11 so that the brake components may initially be brought into contact prior to the spring 40 being compressed.

Industrial Applicability

In operation, the braking apparatus 10 slows the shaft 16 by supplying pressurized fluid to the cavity 32. The pressurized fluid urges the piston 26 against the brake disk 14 and the contact surface 34 of the piston 26 repositions the adjustment member 36, 36A, 36B relative to the disk 14. As various components in the braking apparatus 10 wear, in response, the adjustment member 36, 36A, 36B is repositioned relative to the pin 38 to account for this wear and consequently a suitable gap 42 is maintained.

When the pressurized fluid is removed from the cavity 32, the spring 40, 40A urges the piston away from the adjustment member 36, 36A, 36B so as to re-establish the gap 42 between the contacting brake components. Thus, regardless of the amount of wear on the components of the braking apparatus 10, the travel required by the piston to activate the brake assembly remains generally constant and required brake performance is therefore maintained.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A brake apparatus, comprising,
   a brake disk secured to a shaft;
   a reaction plate secured to a housing;
   a fluid actuated piston having a contact surface which urges the brake disk against the reaction plate to slow rotation of the shaft;
   an adjustment member positioned by the contact surface, the adjustment member being mounted within and slideable relative to the reaction plate;
   a pin including a first portion engaged with the piston, the pin having a second portion in a sliding friction relationship with the adjustment member, wherein the pin extends between the piston and the reaction plate; and
   a spring retained between the adjustment member and the reaction plate, wherein:
   the contact surface positions the adjustment member through movement of the pin relative to the brake disk when fluid is applied to the piston, and
   the spring urges the contact surface away from the adjustment member and brake disk when fluid pressure is removed from the piston.

2. The apparatus of claim 1, wherein:
   the adjustment member is a bushing positioned in sliding contact with the pin,
   movement of the piston toward the brake disk repositions the bushing relative to the pin, and
   the frictional force between the pin and the bushing is greater than the force of the spring on the bushing such that the spring force does not reposition the bushing relative to the pin.

3. The apparatus of claim 2, wherein the spring is a Bellville spring interposed between the bushing and the contact surface.

4. The apparatus of claim 2, wherein the spring is a coil spring interposed between the bushing and the contact surface.

5. The apparatus of claim 2, further comprising a retaining ring secured to the adjustment member, wherein the retaining ring limits the movement of the piston relative to the adjustment member.

6. The apparatus of claim 2, wherein the force of the spring on the piston is greater than the frictional forces between the piston and the housing.

7. The apparatus of claim 1, wherein:
   the adjustment member includes a sleeve in sliding contact with the housing and a bolt positioned in the sleeve,
   movement of the piston toward the brake disk urges a head of the bolt into the sleeve which repositions the sleeve relative to the housing, and
   the frictional force between the sleeve and the housing is greater than the force of the spring on the sleeve such that the spring force does not reposition the sleeve relative to the housing.

8. The apparatus of 7, wherein the spring is a Bellville spring interposed between the sleeve and the head of the bolt.

9. The apparatus of claim 7, wherein the force of the spring transmitted to the piston is greater than the frictional forces between the piston and the housing.

10. A method of operating a brake apparatus having (i) a brake disk secured to a shaft, (ii) a reaction plate secured to a housing, (iii) a fluid actuated piston having a contact surface which urges the brake disk against the reaction plate to slow rotation of the shaft, (iv) an adjustment member positioned by the contact surface, (v) a pin including a first portion engaged with the piston, the pin having a second portion in a sliding friction relationship with the adjustment member, wherein the pin extends between the piston and the reaction plate and the contact surface positions the adjustment member through movement of the pin relative to the brake disk when fluid is applied to the piston, and (vi) a spring interposed between the adjustment member and the contact surface, comprising the steps of:
    positioning the adjustment member relative to the brake disk by applying fluid to the piston; and
    urging the piston away from the adjustment member and brake disk with the spring when fluid pressure is removed from the piston.

11. The method of claim 10, wherein the pin is secured to the housing and positioned parallel to movement of the piston and the adjustment member is a bushing positioned in sliding contact with the pin, further comprising the steps of:
    moving the piston toward the brake disk;
    repositioning the bushing relative to the pin in response to the moving step; and preventing movement of the bushing with the frictional force between the pin and the bushing.

12. The method of claim 11, wherein the urging step includes the step of interposing a Bellville spring between the bushing and the contact surface.

13. The method of claim 11, wherein the urging step includes the step of interposing a coil spring between the bushing and the piston.

14. The method of claim 11, the brake apparatus further comprising a retaining ring secured to the adjustment member, further comprising the steps of limiting movement of the piston relative to the adjustment member with the retaining ring.

15. The method of claim 10, wherein the adjustment member includes a sleeve in sliding contact with the housing and a bolt positioned with the sleeve, further comprising the steps of:

moving the piston toward the brake disk to urge a head of the bolt into the sleeve to reposition the sleeve relative to the housing; and preventing movement of the sleeve by the spring with the frictional force between the sleeve and the housing.

16. The method of claim 15 the urging step further comprising the step of interposing a Bellville spring between the sleeve and the head of the bolt.

17. The method of claim 15, further comprising the step of limiting the frictional forces between the piston and the housing to less than the force of the spring transmitted to the piston.

18. A brake apparatus, comprising a brake disk driven by a shaft;

a reaction plate secured to a housing;

a selectively moveable piston having a contact surface engageable with the brake disk wherein the brake disk is urged against the reaction plate to slow rotation of the shaft in response to compressive movement of the piston;

a pin including a first portion engaged with the piston, the pin having a second portion in a sliding friction relationship with an adjustment member, wherein the pin extends between the piston and the reaction plate;

the adjustment member provided between the piston and the reaction member and being operable to: (i) urge the piston away from the brake disk in response to deactivation of the brake assembly, and (ii) readjust a gap clearance between the brake disk and at least one of the piston and the reaction member in response to brake wear, wherein the contact surface positions the adjustment member through movement of the pin relative to the brake disk when fluid is applied to the piston.

19. The brake assembly of claim 18, wherein the adjustment member is the pin is repositioned relative to the adjustment member in response to readjustment of the gap clearance.

* * * * *